United States Patent [19]
Ritter

[11] Patent Number: 5,596,834
[45] Date of Patent: Jan. 28, 1997

[54] RODENT EXCLUSION DEVICE

[76] Inventor: Vincent A. Ritter, 21B Pheasant Run, Smithfield, R.I. 02917

[21] Appl. No.: 401,808

[22] Filed: Mar. 10, 1995

[51] Int. Cl.$^6$ ................................ A01M 29/00
[52] U.S. Cl. ................ 43/124; 43/108; 114/221 R; 52/101
[58] Field of Search .............. 43/124, 121, 108, 43/58, 132.1, 1; 114/221 R; 47/23, 24; 52/101

[56] References Cited

U.S. PATENT DOCUMENTS 3,362,115  1/1968  Nyhus et al. ..................... 52/101
4,404,778  9/1983  Ushimaru ........................ 52/101

Primary Examiner—J. Elpel

[57] ABSTRACT

A flexible strip of material having sharp protruding crowns which, once installed on wire, rope, cable, poles, or other similar objects in which rodents are utilizing as runways, will repel such rodents by inaccessibility and therefore cause them to turn back to the point where they first contacted the wire, rope or other objects. Thus preventing such rodents from gaining access to ships, buildings, or other areas where wires, ropes or other objects are connected.

4 Claims, 1 Drawing Sheet

RODENT EXCLUSION DEVICE

CROSS REFERENCES TO RELATED APPLICATIONS

U.S. Pat. No. 4,477,997, filed on Feb. 16, 1983, shows an elevated wire supported rodent trap.

BACKGROUND

For many years members of the pest control industry have accepted the fact that rodents will readily climb on ropes, pipes, wires or other such objects in order to gain access to ships, buildings etc. In fact the introduction of the Norway Rat to the United States was due to the rats crossing dock lines and entering ships in their native country and being transported here. Once the ships docked the rats simply crossed the lines again and established themselves quickly.

To date there is no such device of this nature that will stop such rodents from gaining access to the upper portions of buildings or ships which would otherwise be inaccessible to them. The object of the device would be to exclude, not ensnare a rodent from these areas by means of physical pain if the rodent were to attempt to cross the device once installed. Whereby no dead carcasses would need to be removed from hard to reach areas as the rodents would not be killed by the device but merely repelled.

SUMMARY OF THE INVENTION

A flexible, non corrosive strapping material such as but not limited to polypropylene. Which is used as the base of the strip, contains small crown shaped pieces also made of non corrosive material such as but not limited to aluminum or brass. And common VELCRO fastening material sewn in on each end to secure the strips to the target object. The crown shaped pieces would be manufactured as having somewhat sharp edges on the crown blades which if contacted by the soft underside foot of a rodent would cause pain and discomfort to the rodent thereby causing the rodent to turn away from the area of the strip. The crown shaped pieces would be attached to the strapping by means of rivet like protrusions extending from the bottom of the crowns which would be stamped through the strapping material thereby obtaining a permanent installation. The spacing of the pieces on the strapping would be sufficient to allow a wrapping effect of the strip while maintaining an insufficient distance to allow rodents to place their feet in between the crowns. The strapping would be brightly colored in order to maintain visibility as a safety precaution and would come with instructions to be installed out of normal human reach, such as midway between ship dock lines, or over 10 feet from the ground etc. The completed device could be utilized as a permanent fixture or a temporary installation as needed due to ease of application.

DETAILED DESCRIPTION

Figure 1:
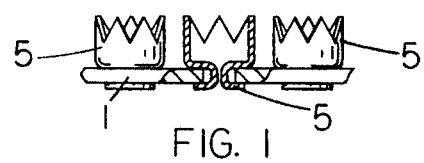
FIG. 1 an independent view of crown shaped pieces showing horizontal alignment with other such pieces depicting sharp, pointed edges. Also a sectional view of a piece once installed through the strapping material.
Figure 2:
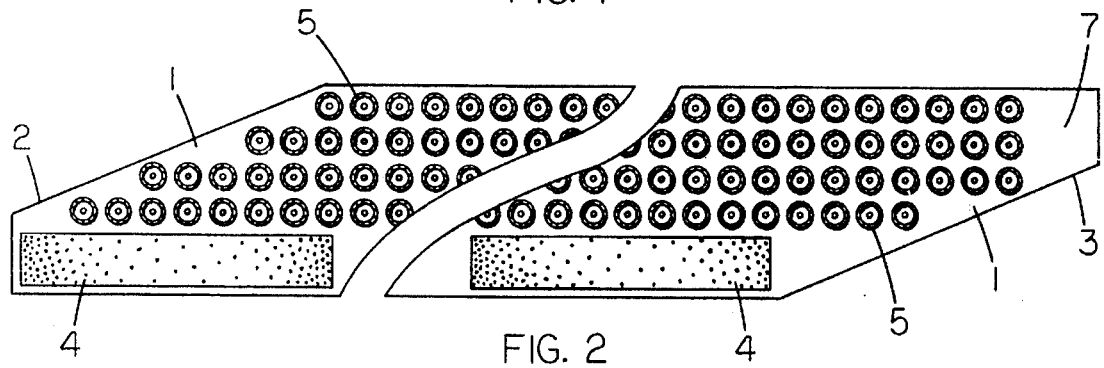
FIG. 2 a top view of the completed device showing shape of strapping, alignment of crown shaped pieces, and location of male VELCRO fastening material located on each end.
Figure 3:
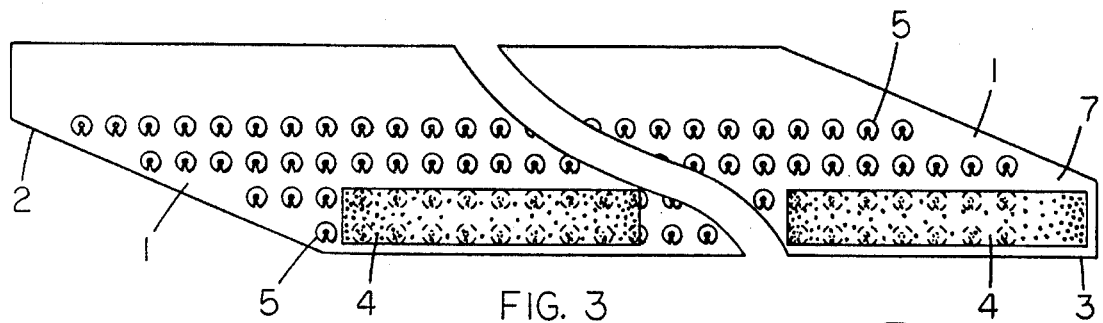
FIG. 3 a bottom view of the completed device showing shape of the strapping, alignment of the bottom of the crowns once installed to the strapping material, and location of female VELCRO fastening material which would connect with male upon installation.
Figure 4:
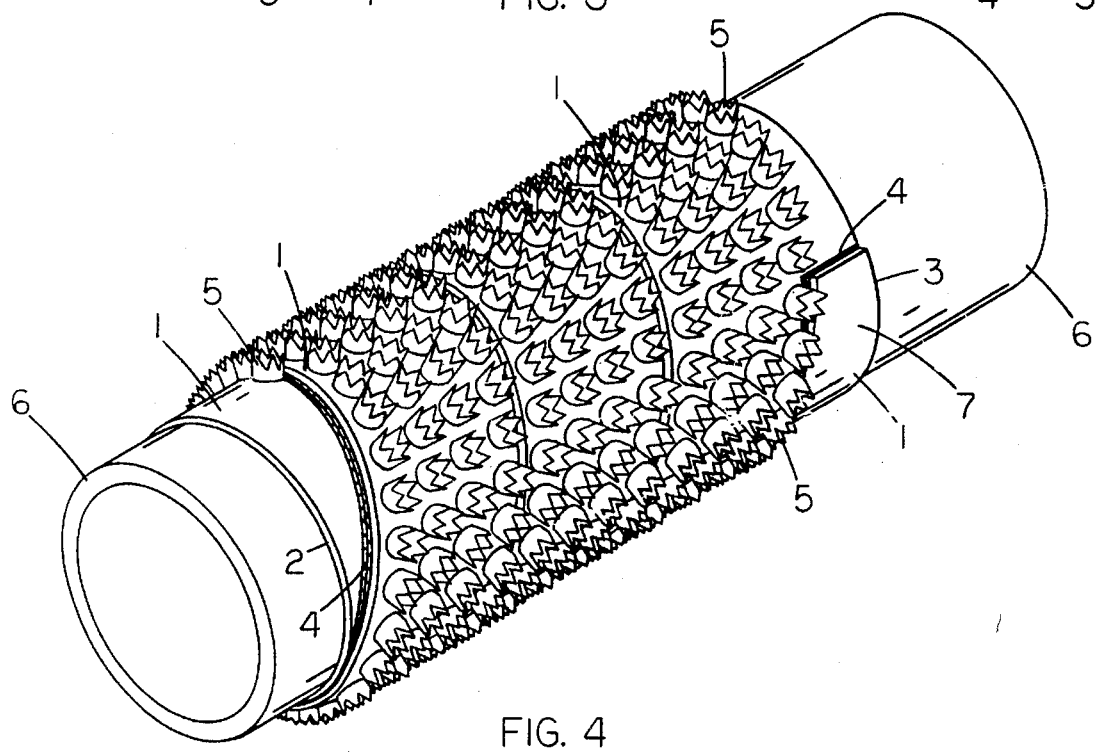
FIG. 4 a perspective view of the completed device installed on a target object (pipe).

The exclusion device as best seen in FIG. 4 includes an elongated rectangular base 1 made of 2" wide flexible polypropeline strapping material which is cut to a length of 24" for objects up to 1" in diameter, and shaped as shown in FIG. 2 in order to obtain a wrapping effect on a cylindrical shaped object 6. A variety of sizes would be available to accommodate objects of greater diameters, all being constructed of the same materials, and shaped exactly as the original device using the same angle cuts, only in greater dimensions. Shaping of the strap would be obtained by making an angled cut of 67.5 deg. at end 2 beginning ⅝" above the bottom of the end and continuing to the top of the same. At end 3 a similar cut would be made at a reverse angle to end 2. This would enable the strap to be neatly wrapped around virtually any target object without part of the ends protruding from the wrap which could cause unraveling of the device. (refer FIG. 4). The lower portion of the strap containing the area of space before the beginning of the 67.5 deg angle cut would contain male VELCRO strips 4 of 3"×½" each, stitched at both ends of the area as shown in FIG. 2. The area between the VELCRO strips would remain free of crowned pieces so that the strap can be overlapped without interference and secured with the VELCRO. (refer FIG. 4) The upper portion of the strap would contain the crown shaped pieces 5 installed by means of rivet like protrusions at the bottom of the crowns in exact rows with each piece being spaced ⅛" apart. The rows would be spaced ⅛" apart in order to insure that all pieces are spaced evenly both horizontally and vertically. An area of ¾" 7 beginning at the right of end 3 would contain no pieces in order to be held by the applicator to secure the device. The crowned shaped pieces would be stamped to a finished diameter of ³⁄₁₆" with sharp points protruding vertically at a 90 deg. angle to the strap. And would be of a one piece construction with a rivet like protrusion at the bottom of the piece which would be used to fasten the crown to the strap by means of stamping.

I claim:

1. A rodent exclusion device for use on a supporting surface, comprising:

an elongate planar strip of flexible material having first and second opposing surfaces and first and second opposing longitudinal edges, the first surface having an elongate portion of hook and loop material extending adjacent the first longitudinal edge, the second surface having a mating elongate portion of hook and loop material extending adjacent the second longitudinal edge, a means for excluding rodents on the first surface, said means for excluding rodents including a plurality of sharp projections, and whereto the elongate strip of flexible material is windable about said supporting surface in a spiral earning the elongate portions of hook and loop material to interengage.

2. The rodent exclusion device of claim 1, wherein the elongate strip of material is generally rectangular and having opposed, parallel, tapered end portions.

3. The rodent exclusion device of claim 3, wherein the means for excluding rodents further includes crown peices, said crown peices having said plurality of sharp projections.

4. The rodent exclusion device of claim 4, wherein the strip of material is a bright color for safety and visibility.

* * * * *